C. F. CHRISTOPHER.
SCALE.
APPLICATION FILED MAY 18, 1912.

1,067,213.

Patented July 8, 1913.

2 SHEETS—SHEET 1.

Calvin F. Christopher,
Inventor

Witnesses by C. A. Snow & Co.
Attorneys

C. F. CHRISTOPHER.
SCALE.
APPLICATION FILED MAY 18, 1912.

1,067,213.

Patented July 8, 1913.
2 SHEETS—SHEET 2.

Calvin F. Christopher,
Inventor

Witnesses by C. A. Snow & Co.
Attorneys

UNITED STATES PATENT OFFICE.

CALVIN F. CHRISTOPHER, OF ASHEVILLE, NORTH CAROLINA.

SCALE.

1,067,213. Specification of Letters Patent. Patented July 8, 1913.

Application filed May 18, 1912. Serial No. 698,223.

*To all whom it may concern:*

Be it known that I, CALVIN F. CHRISTOPHER, a citizen of the United States, residing at Asheville, in the county of Buncombe and State of North Carolina, have invented a new and useful Scale, of which the following is a specification.

This invention relates to scales of that type designed for use on counters and the like, one of the objects of the invention being to provide means combined with the scale whereby not only will the weight be accurately indicated but the price to be charged will also be disclosed.

Another object is to provide scales having improved mechanism for operating the weight and price indicating mechanism.

A further object is to provide scales which are simple and compact in construction, are made up of but few parts, and which will not readily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings the preferred form of the invention has been shown.

Figure 1:
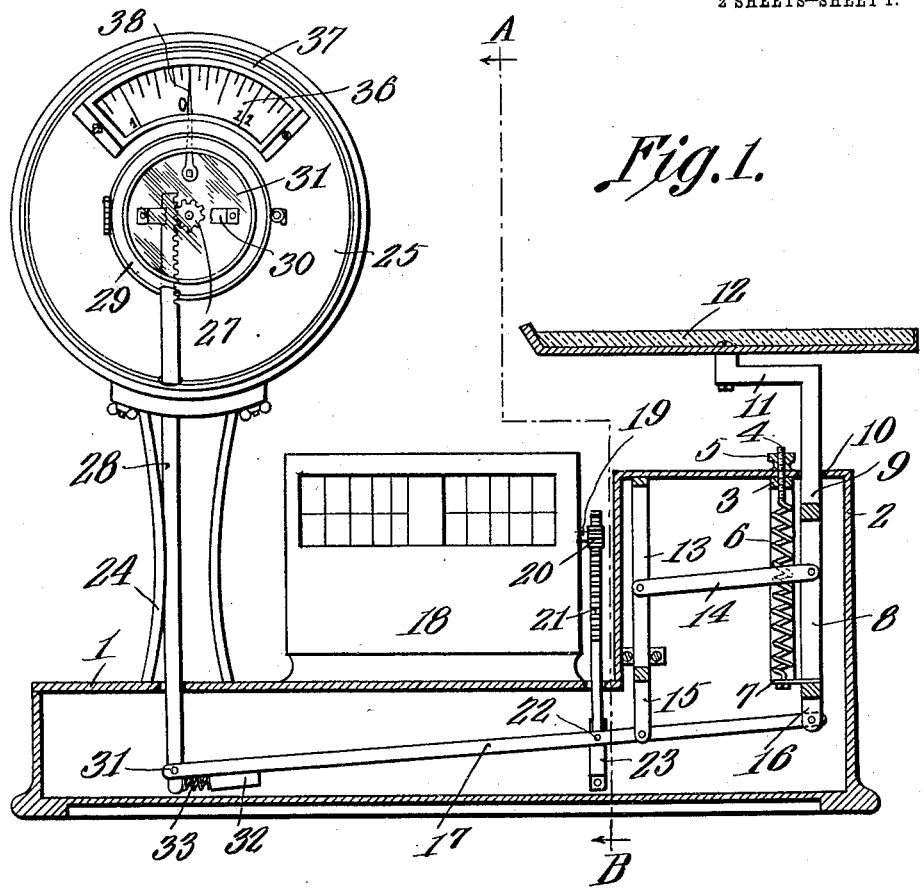
Figure 4:
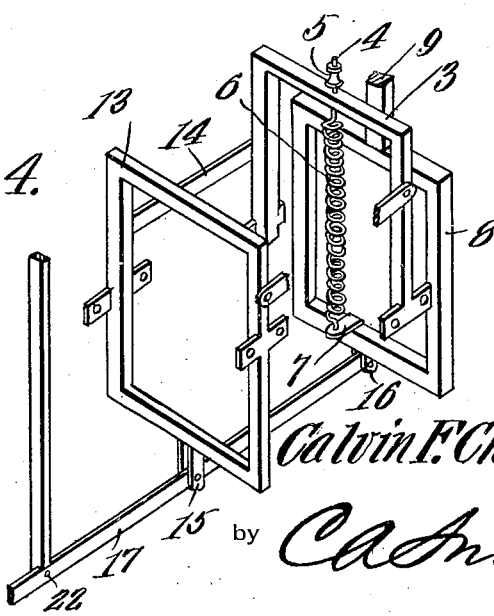
Figure 2:
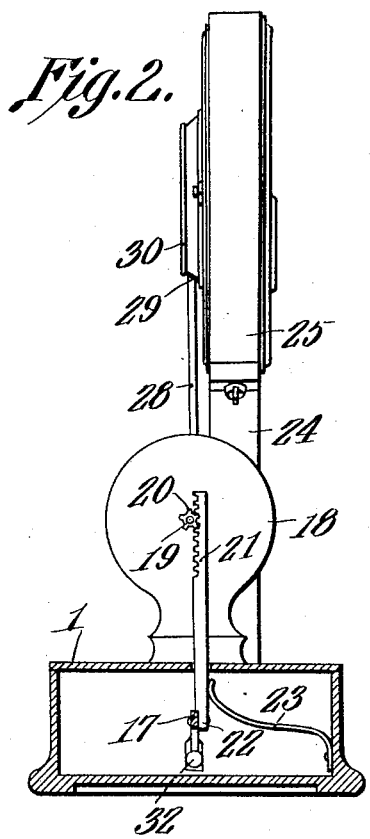
Figure 5:
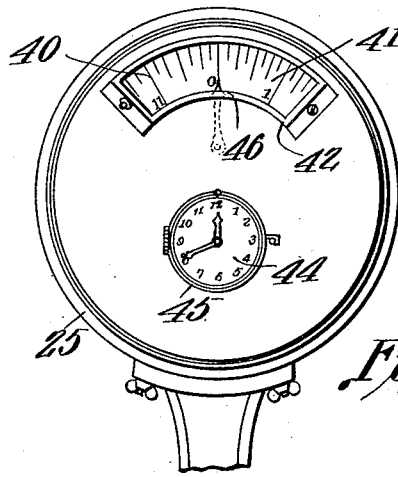
Figure 3:
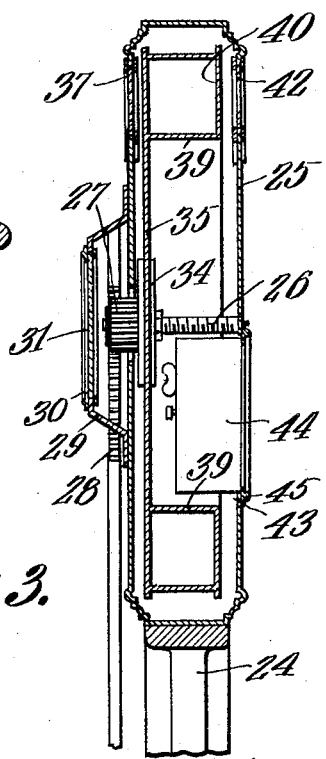

In said drawings:—Figure 1 is a view partly in section and partly in front elevation of the scales. Fig. 2 is a section on line A—B Fig. 1. Fig. 3 is an enlarged section through the weight indicating mechanism. Fig. 4 is a perspective view of the mechanism contained within the body of the scales. Fig. 5 is an elevation of that side of the weight indicating portion designed to be viewed by the customer.

Referring to the figures by characters of reference 1 designates a hollow base having a main casing or housing upstanding therefrom and preferably integral therewith, this housing being indicated at 2.

Secured within the housing 2 is an inverted yoke-like frame 3 within the upper portion of which a stem 4 is slidably mounted, this stem being screw threaded and engaged by an adjusting nut 5. The stem is adapted to extend upwardly through the housing 2 and the nut is mounted on the upper surface of the housing so as to be accessible readily for the purpose of varying the tension of a spring 6 which extends downwardly from and is supported by the stem 4. The lower end of the spring 6 is attached to an ear 7 outstanding from the lower end of a frame 8 which is mounted to work up and down within the housing 2 and has an arm 9 extending upwardly therefrom and through an opening 10 in the top of the housing 2. The upper end of the arm is preferably offset, as shown at 11, and supports a tray 12 on which the material to be weighed is placed.

Another or fixed frame 13 is secured within the housing 2 and has parallel links 14 pivotally connected to the sides thereof and also to the sides of the movable frame 8. Ears 15 extend downwardly from the fixed frame 13 and additional ears 16 extend downwardly from the movable frame 8, the ears 15 and 16 being pivotally connected to a beam 17 which extends longitudinally within the base 1 and is parallel with the links 14. Thus it will be seen that the links, the two frames 8 and 13, and the beam 17 form a parallelogram, whereby the arm 9 is maintained constantly perpendicular to the base 1.

A casing 18 is mounted on the base 1 at one side of the housing 2 and has a shaft 19 mounted for rotation therein. This shaft is designed to actuate a price indicating device such as shown, for example, in Patent No. 1,006,062, issued to me on October 17, 1911. Inasmuch as this price indicating mechanism constitutes no part of the present invention, except as included broadly in the combination, it is not deemed necessary to describe in detail the construction thereof and the arrangement of the data thereon. The shaft 19 has a gear 20 secured to it and this gear is constantly engaged by a rack 21 which extends downwardly within the base 1 and is pivotally connected to the beam 17, as shown at 22. A leaf spring 23 or the like is arranged within the base and bears against the rack 21 so as to hold said rack yieldingly in engagement with the gear.

It will be noted that the rack 21 is parallel with the fixed frame 13 so as to have a straight up and down movement during the actuation of the beam 17.

Upstanding from the base 1 is a standard 24 on which is supported a cylindrical casing 25. A shaft 26 is journaled within the center of the casing and projects beyond one face of said casing, said projecting end portion carrying a gear 27 which is constantly in mesh with a rack 28. A flange 29 extends outwardly from the casing 25 and surrounds gear 27, this flange being concentric with the shaft 26 and supporting a hinged closure 30 which preferably includes a transparent portion 31. Thus it will be seen that gear 27 and rack 28 are clearly visible through the closure. The rack extends through an opening in the flange 29 and downwardly into the base 1, the lower end portion of the rack being pivotally connected to the beam 17, as shown at 31'. A casing 32 is connected to the beam 17 close to the rack 28 and contains a coiled spring 33 one end portion of which bears against the end portion of the rack 28, thus serving to press the upper end portion of the rack yieldingly into engagement with the gear 27. A retaining bracket 34 may be mounted on the casing 25 back of the closure 30 and, if desired, can be utilized as a bearing for the shaft 26.

A disk 35 is secured to and rotates with the shaft 26 and has a circular series of graduations thereon, as indicated at 36 in Fig. 1, these graduations being designed to appear successively within an arcuate opening 37 formed in that face of the casing 25 from which the flange 29 projects. A stationary intake 38 is secured to the casing and extends across the opening 37.

Concentric flanges 39 extend from that face of disk 35 opposite to that on which the graduations 36 are formed and the flanges 39 carry a ring 40 having a circular series of graduations 41 thereon adapted to appear successively within an arcuate opening 42 formed in that side of the casing 25 to be viewed by the customers. An opening 43 is formed in the same side of the casing 25 as is the opening 42 and detachably mounted within this opening 43 is a clock 44 the face of which can be readily seen by the customers. This clock may be detachably held in any manner desired as, for example, by means of a hinged retaining ring 45. A stationary index 46 is connected to the casing 35 and extends into the opening 42.

When the tray 12 is moved downward under the weight of material deposited thereon, the spring 6 will be elongated and frame 8 will bear downwardly on one end portion of the beam 17. The long arm of the beam will thus be raised and the two racks 21 and 28 will also be moved upwardly. Rack 21 will cause gear 20 and the mechanism operated thereby to rotate while rack 28 will rotate the gear 27 and disk 35. Thus the weight of the material on the tray will be indicated by the graduations appearing in the openings 37 and 42 while the price to be charged will be designated by characters appearing within an opening in the casing 18. By forming the graduations 41 on a ring 40, a large circular recess is thus formed into which the clock 44 can project and the rotation of disk 35 will not be interfered with.

What is claimed is:—

1. In scales, the combination with members forming a parallelogram including a scale beam, means carried by one member of the parallelogram for holding material to be weighed, and an adjustable yielding element for maintaining the scale beam normally in a predetermined position, of a casing having apertures in opposed faces, a disk mounted for rotation within the casing and having graduations thereon adapted to appear successively within one of the openings, flanges outstanding from the disk, a graduated ring carried by the flanges, said graduations being designed to appear successively within the other opening in the casing, and means operated by the scale beam for rotating the disk.

2. In scales, the combination with members forming a parallelogram including a scale beam, means carried by one member of the parallelogram for holding material to be weighed, and an adjustable yielding element for maintaining the scale beam normally in a predetermined position, of a casing having apertures in opposed faces, a disk mounted for rotation within the casing and having graduations thereon adapted to appear successively within one of the openings, flanges outstanding from the disk, a graduated ring carried by the flanges, said graduations being designed to appear successively within the other opening in the casing, a gear revoluble with the disk, a rack meshing therewith and connected to the beam, and yielding means carried by the beam for holding the rack in engagement with the gear.

In testimony that I claim the foregoing as my own, I have hereto affixed my signature in the presence of two witnesses.

CALVIN F. CHRISTOPHER.

Witnesses:
 CHARLES S. TOWE,
 J. D. PENLAND.

Copies of this patent may be obtained for five cents each, by addressing the "Commissioner of Patents, Washington, D. C."